US009308673B2

(12) United States Patent
Feng

(10) Patent No.: US 9,308,673 B2
(45) Date of Patent: Apr. 12, 2016

(54) MULTI-FUNCTIONAL RUBBING AND SEPARATING DEVICE USED FOR WASHING WASTE PLASTICS

(71) Applicant: Yubin Feng, Guangzhou (CN)

(72) Inventor: Yubin Feng, Guangzhou (CN)

(*) Notice: Subject to any disclaimer, the term of this patent is extended or adjusted under 35 U.S.C. 154(b) by 53 days.

(21) Appl. No.: 14/165,104

(22) Filed: Jan. 27, 2014

(65) Prior Publication Data

US 2014/0213159 A1  Jul. 31, 2014

(30) Foreign Application Priority Data

Jan. 31, 2013 (CN) .......................... 2013 1 0039928

(51) Int. Cl.
*B07B 1/20* (2006.01)
*B29B 17/02* (2006.01)
*B24B 27/033* (2006.01)
*B08B 1/04* (2006.01)
*B08B 3/10* (2006.01)
*B29K 105/06* (2006.01)

(52) U.S. Cl.
CPC . *B29B 17/02* (2013.01); *B07B 1/20* (2013.01); *B08B 1/04* (2013.01); *B08B 3/10* (2013.01); *B24B 27/033* (2013.01); *B29B 2017/0286* (2013.01); *B29K 2105/065* (2013.01); *Y02W 30/622* (2015.05)

(58) Field of Classification Search
CPC ............ D21D 5/06; D21D 5/026; B03B 5/56; B07B 1/18; B07B 1/20; B29B 2017/0286; B29B 17/02; B24B 31/08; B08B 1/04; B08B 3/10; Y02W 30/622

USPC .............. 451/32, 34, 35, 104, 106, 326, 328; 241/24.11, 24.28, 70, 71, 75, 73, 74, 241/138, 154, 166, 167, 185.5, 188.1; 209/270, 284, 286, 288, 293, 273
See application file for complete search history.

(56) References Cited

U.S. PATENT DOCUMENTS

| 3,973,735 | A | * | 8/1976 | Ito et al. ........................ 241/73 |
| 4,265,408 | A | * | 5/1981 | Voelskow ...................... 241/87 |
| 4,538,767 | A | * | 9/1985 | Pimley ........................ 241/79.3 |
| 5,163,627 | A | * | 11/1992 | Bouche ......................... 241/23 |
| 5,863,003 | A | * | 1/1999 | Smith ............................ 241/73 |
| 5,975,443 | A | * | 11/1999 | Hundt et al. ................... 241/27 |
| 6,238,516 | B1 | * | 5/2001 | Watson et al. ................... 162/8 |

(Continued)

FOREIGN PATENT DOCUMENTS

| CN | 201516655 | 6/2010 |
| CN | 103112102 | 5/2013 |
| CN | 203125776 | 8/2013 |

*Primary Examiner* — Eileen Morgan
(74) *Attorney, Agent, or Firm* — Colin P. Cahoon; Shaukat A. Karjeker; Carstens & Cahoon, LLP

(57) ABSTRACT

Provided is a multi-functional rubbing and separating device, comprising a main body, a rotating axle and lapping blades; wherein a feeding port is disposed on one end of the main body and a discharge port is disposed on another end; the rotating axle and lapping blades are disposed inside said main body; the lapping blades are distributed on outer cylindrical surface of the rotating axle; and multiple through-holes are disposed on an sidewall of the main body. The multi-functional rubbing and separating device herein is added between a flotation tank and a washing tank, which can effectively improve the washing quality for waste plastics, thereby separating waste plastics and impurities more thoroughly and improving the quality of recycled products.

4 Claims, 2 Drawing Sheets

(56) References Cited

U.S. PATENT DOCUMENTS

| | | | |
|---|---|---|---|
| 6,402,064 B1* | 6/2002 | Tango et al. ..................... 241/21 |
| 6,568,410 B1 | 5/2003 | Teruggi et al. |
| 7,497,337 B2* | 3/2009 | Tse ............................... 209/294 |
| 7,584,856 B2* | 9/2009 | Miller et al. ............... 209/139.1 |
| 2002/0079250 A1* | 6/2002 | Fahrbach et al. ............. 209/273 |
| 2014/0209715 A1* | 7/2014 | Feng ............................... 241/15 |
| 2014/0263007 A1* | 9/2014 | Nemedi ........................ 210/173 |
| 2014/0263770 A1* | 9/2014 | Hissong et al. ............ 241/24.19 |

\* cited by examiner

MULTI-FUNCTIONAL RUBBING AND SEPARATING DEVICE USED FOR WASHING WASTE PLASTICS

CROSS-REFERENCE TO RELATED APPLICATIONS

This application claims priority to Chinese Application No. 201310039928.6, "MULTI-FUNCTIONAL RUBBING AND SEPARATING DEVICE USED FOR WASHING WASTE PLASTICS", filed on Jan. 31, 2013, which is hereby incorporated by reference in its entirety.

TECHNICAL FIELD

The present disclosure relates to the technical field of waste plastics recycling, and more particularly to a multi-functional rubbing and separating device used for washing waste plastics.

BACKGROUND ART

Equipment for crushing, separating and washing waste plastics is commonly used in the field of waste plastics recycling, and due to lower gross profit rate of this industry, it is difficult to apply higher-priced production and process-control equipment. In current equipment for crushing, separating and washing waste plastics, after the materials pass through the flotation tank where impurities such as metal or silt are removed from the materials, said materials will be directly transported to the washing tank for further washing so as to remove light impurities on the surface of said materials. However, since the waste plastics generally carries impurities such as label paper, greasy dirt, and so on, after the materials pass through the flotation tank, the fluid medium itself in the flotation tank forms impurities attaching to the surface of the waste plastics; the impurities herein are difficult to be removed by just relying on gravity flotation separation effect in the washing tank, thereby easily affecting the subsequent process and quality of the final recycled products.

SUMMARY OF THE INVENTION

In view of defects existing in the prior art mentioned above, an object of the present invention is to provide a multi-functional rubbing and separating device which is capable of removing impurities (such as label paper, greasy dirt and so on) attaching on the surface of waste plastics effectively, and improving the washing effect of the materials and the quality of finished products.

The object of the present invention is realized by the following technical scheme:

A multi-functional rubbing and separating device, comprising: a main body, a rotating axle and lapping blades; wherein a feeding port is disposed on one end of the main body and a discharge port is disposed on another end; the rotating axle and lapping blades are disposed inside said main body; the lapping blades are distributed on outer cylindrical surface of the rotating axle; and multiple through-holes are disposed on an sidewall of the main body.

Preferably, said main body is a hollow cylinder with both ends closed, inner space of the main body close to the feeding port forms a rubbing section, and inner space close to the discharge port forms a separating and dehydrating section.

Preferably, there are multiple through-holes distributed on the sidewall of said main body at the separating and dehydrating section, and the sidewall of said main body at the rubbing section is a closed structure. At the rubbing section, with the high-speed revolution of the lapping blades, the materials (containing waste plastics and fluid medium such as water, saline and so on) are flapped and thrown to hit the inner wall of the main body with high-speed, so that the impurities (such as label paper, greasy dirt, fluid medium from the flotation tank, and so on) attaching to the surface of the waste plastics are separated; at the separating and dehydrating section, with the high-speed revolution of the lapping blades, the impurities having been separated are thrown, along with the fluid medium, out of the main body through the through-holes, and the waste plastics will be transported to the discharge port.

Preferably, in a direction for transporting materials, a distribution density of said through-holes on the sidewall of said main body at the separating and dehydrating section is gradually increasing. That is, the closer to the discharge port, the more is the number of the through-holes. By means of gradually increasing the density of the through-holes towards the discharge port, the waste plastics and fluid medium can be separated more thoroughly, so as to improve the washing quality for the materials.

Preferably, said lapping blades are spirally distributed on the outer cylindrical surface of said rotating axle.

Preferably, said lapping blades are obliquely fixed on the outer cylindrical surface of said rotating axle.

Preferably, said lapping blades are steel plates.

Preferably, said rotating axle passes through said main body axially along the center axis, and said rotating axle connects to an external rotary driving mechanism.

The working principle of the multi-functional rubbing and separating device is as follows: the rotary driving mechanism drives the rotating axle to drive the lapping blades to rotate at a high speed, after the materials (containing waste plastics, and fluid medium such as water, saline and so on) are transported into the main body from the feeding port, along with the high-speed revolution of the lapping blades, the impurities attaching on the surface of the waste plastics are separated preliminarily in the rubbing section; and in the separating and dehydrating section, after the materials are flapped by the lapping blades, the impurities are thrown, along with the fluid medium, out of the main body through the through-holes. The waste plastics, because of the kinetic energy provided by the lapping blades, will bounce off the discharge port of the multi-functional rubbing and separating device.

As compared with the prior art, the present disclosure has following advantages:

The multi-functional rubbing and separating device herein has simple structure and is convenient to use. The multi-functional rubbing and separating device herein is added between a flotation tank and a washing tank, which can effectively improve the washing quality for waste plastics, thereby separating waste plastics and impurities more thoroughly and improving the quality of recycled products.

According to the multi-functional rubbing and separating device of the present disclosure, by means of high-speed revolution of the lapping blades, the lapping blades simultaneously agitate, flap and separate the materials, furthermore, the rubbing section, and separating and dehydrating section are arranged inside the main body, thereby achieving a rather good separating effect. The impurities such as label paper, greasy dirt, fluid medium from the flotation tank, and so on, attaching to the surface of the waste plastics can all be separated, therefore, after the materials enter the washing tank, the impurities thereof are reduced greatly, which can simplify the subsequent washing process.

PREFERRED EMBODIMENTS OF THE INVENTION

The present invention will be described in further details with the accompanying drawings and the following embodiments. It should be understood that the specific embodiments described herein are merely examples to illustrate the invention, not to limit the present invention.

Embodiments

Figure 1:
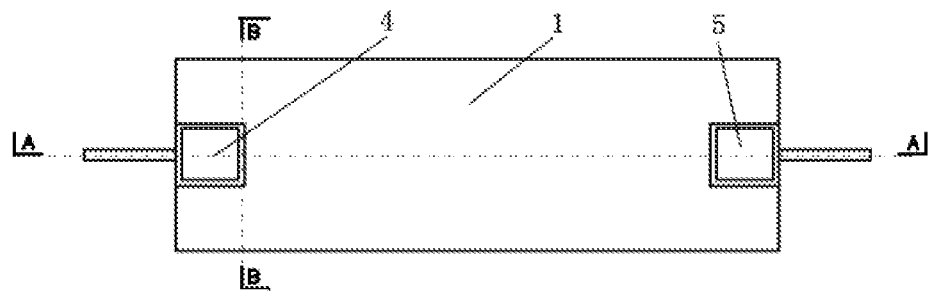
FIG. 1 is a top view illustrating the structure of the multi-functional rubbing and separating device according to one embodiment of the present invention.
Figure 3:
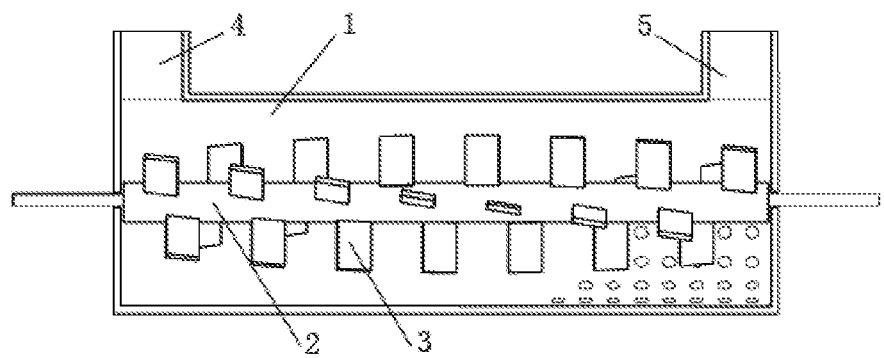
FIG. 3 is a cross-section view taken along A-A line of FIG. 1.
Figure 4:
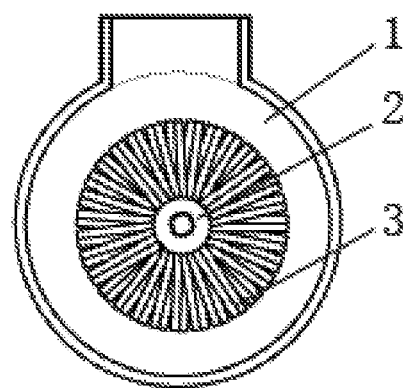
FIG. 4 is a cross-section view taken along B-B line of FIG. 1.

In the embodiment as shown in FIG. 3 and FIG. 4, the multi-functional rubbing and separating device comprises a main body 1, a rotating axle 2 and lapping blades 3. As shown in FIG. 1, a feeding port 4 is disposed on one end of the main body 1 and a discharge port 5 is disposed on the other end, the rotating axle 2 and lapping blades 3 are disposed inside the main body 1, and the lapping blades 3 are distributed on the outer cylindrical surface of the rotating axle; moreover, multiple through-holes 6 are disposed on the sidewall of the main body 1.

Figure 2:
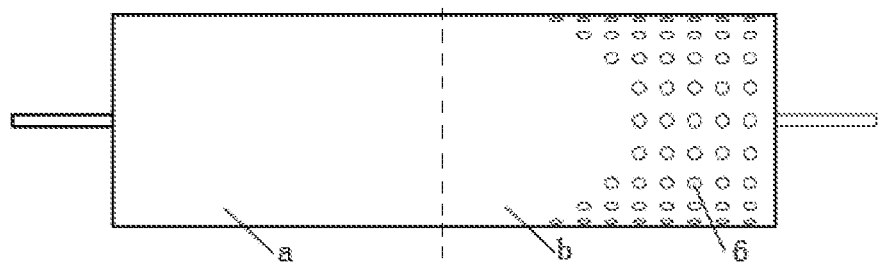
FIG. 2 is a bottom view of the multi-functional rubbing and separating device as shown in FIG. 1.

As shown in FIG. 2, said main body 1 is a hollow cylinder with both ends closed, the inner space close to the feeding port 4 forms a rubbing section a, and the inner space close to the discharge port 5 forms a separating and dehydrating section b.

There are multiple through-holes 6 distributed on the sidewall of said main body at the separating and dehydrating section b, while the sidewall of said main body at the rubbing section a is a closed structure. At the rubbing section, with the high-speed revolution of the lapping blades, the materials (containing waste plastics and fluid medium such as water, saline and so on) are flapped and thrown to hit the inner wall of the main body with high-speed, so that the impurities (such as label paper, greasy dirt, fluid medium from the flotation tank, and so on) attaching to the surface of the waste plastics are separated; at the separating and dehydrating section, with the high-speed revolution of the lapping blades, the impurities having been separated are thrown, along with the fluid medium, out of the main body 1 through the through-holes, and the waste plastics will be transported to the discharge port 5.

In the direction for transporting materials, the distribution density of said through-holes 6 on the sidewall of said main body 1 at the separating and dehydrating section is gradually increasing, that is, the closer to the discharge port 5, the more is the number of the through-holes 6. By means of gradually increasing the density of the through-holes 6 towards the discharge port 5, the waste plastics and fluid medium can be separated more thoroughly, so as to improve the washing quality for the materials.

As shown in FIG. 3, the lapping blades are spirally distributed on the outer cylindrical surface of said rotating axle.

The lapping blades are obliquely fixed on the outer cylindrical surface of said rotating axle.

The lapping blades are in the form of rigid plates, such as steel plates. With regard to waste plastics, the separating effect with steel plates is better than with flexible plates.

The rotating axle passes through said main body axially along the center axis, and said rotating axle connects to an external rotary driving mechanism.

The working principle of the multi-functional rubbing and separating device is as follows: the rotary driving mechanism drives the rotating axle to drive the lapping blades to rotate at a high speed, after the materials (containing waste plastics, and fluid medium such as water, saline and so on) are transported into the main body from the feeding port, along with the high-speed revolution of the lapping blades, the impurities attaching on the surface of the waste plastics are separated preliminarily in the rubbing section; and in the separating and dehydrating section, after the materials are flapped by the lapping blades, the impurities are thrown, along with the fluid medium, out of the main body through the through-holes. The waste plastics, because of the kinetic energy provided by the lapping blades, will bounce off the discharge port of the multi-functional rubbing and separating device.

The foregoing examples are preferred embodiments of the present invention only and not intended to limit the present disclosure. It should be understood that, to the person skilled in the art, various modifications and improvements can be made without departing from the spirit and principle of the present disclosure, which should all be included within the scope of the present disclosure. Therefore, the protection scope of the present disclosure shall be defined by the appended claims.

What is claimed is:

1. A multi-functional rubbing and separating device, comprising: a main body, a rotating axle and lapping blades;
    wherein a feeding port is disposed on one end of the main body and a discharge port is disposed on another end, the feeding port and the discharge port each located at an upper part of said main body;
    wherein the rotating axle and lapping blades are disposed inside said main body; the lapping blades are distributed on an outer cylindrical surface of the rotating axle;
    wherein a first inner space of the main body, close to the feeding port, forms a rubbing section, and a second inner space, close to the discharge port, forms a separating and dehydrating section; and
    wherein multiple through-holes are distributed on a sidewall of said main body at the separating and dehydrating section, and the sidewall of said main body at the rubbing section is a closed structure;
    wherein distribution density of said through-holes on the sidewall of said main body at the separating and dehydrating section gradually increases in a direction of materials transport; and wherein said lapping blades are spirally distributed and obliquely fixed on the outer cylindrical surface of said rotating axle.

2. The multi-functional rubbing and separating device according to claim 1, wherein, said main body is a hollow cylinder with both ends closed.

3. The multi-functional rubbing and separating device according to claim 1, wherein, said lapping blades are steel plates.

4. The multi-functional rubbing and separating device according to claim 1, wherein, said rotating axle passes through said main body axially along the center axis, and said rotating axle connects to an external rotary driving mechanism.

* * * * *